US010153507B1

(12) United States Patent
Lahalih

(10) Patent No.: US 10,153,507 B1
(45) Date of Patent: Dec. 11, 2018

(54) METHOD OF MAKING A NANOCOMPOSITE POLYELECTROLYTE MEMBRANE

(71) Applicant: KUWAIT INSTITUTE FOR SCIENTIFIC RESEARCH, Safat (KW)

(72) Inventor: Shawqui M. Lahalih, Safat (KW)

(73) Assignee: Kuwait Institute for Scientific Research, Safat (KW)

(*) Notice: Subject to any disclaimer, the term of this patent is extended or adjusted under 35 U.S.C. 154(b) by 0 days.

(21) Appl. No.: 16/049,449

(22) Filed: Jul. 30, 2018

(51) Int. Cl.
*H01M 8/1086* (2016.01)
*H01M 8/1069* (2016.01)
*H01M 8/1051* (2016.01)
*H01M 8/1018* (2016.01)

(52) U.S. Cl.
CPC ......... *H01M 8/1093* (2013.01); *H01M 8/109* (2013.01); *H01M 8/1051* (2013.01); *H01M 8/1076* (2013.01); *H01M 2008/1095* (2013.01)

(58) Field of Classification Search
None
See application file for complete search history.

(56) References Cited

U.S. PATENT DOCUMENTS

| 4,020,239 | A | 4/1977 | Armstrong |
| 4,696,686 | A | 9/1987 | Usami et al. |
| 5,173,235 | A | 12/1992 | Kamei et al. |
| 5,547,551 | A | 8/1996 | Bahar et al. |
| 6,692,858 | B2 | 2/2004 | Higuchi et al. |
| 9,073,014 | B1 | 7/2015 | Lahalih |
| 2006/0235127 | A1 | 10/2006 | Moad et al. |
| 2009/0288764 | A1 | 11/2009 | Arrington |
| 2011/0160345 | A1 | 6/2011 | Cooper et al. |
| 2014/0158287 | A1 | 6/2014 | Takeoka et al. |
| 2015/0332802 | A1 | 11/2015 | Jeong et al. |

FOREIGN PATENT DOCUMENTS

| CN | 1746216 A | 3/2006 |
| CN | 102437348 B | 11/2013 |
| EP | 2960054 A1 | 12/2015 |

*Primary Examiner* — Basia A Ridley
*Assistant Examiner* — Heng M. Chan
(74) *Attorney, Agent, or Firm* — Richard C. Litman

(57) ABSTRACT

The method of making a nanocomposite polyelectrolyte membrane is a process for forming membranes for use in hydrogen and methanol fuel cell applications, for example. A hydrophobic polymer, such as polypropylene, is blended with a nanofiller, such halloysite nanotubes (HNTs) or propylene-grafted maleic anhydride nano-layered silica (Ma-Si), to form a dry mix, which is then pelletized for extrusion in a twin-screw extruder to form a thin film nanocomposite. The thin film nanocomposite is then annealed and cold stretched at room temperature. The cold stretching is followed by stretching at a temperature ranging from approximately 110° C. to approximately 140° C. The nanocomposite is then heat set to form the nanocomposite polyelectrolyte membrane. The nanocomposite polyelectrolyte membrane may then be further plasma etched and impregnated with a sulfonated polymer, such as sulfonated melamine formaldehyde, a polycarboxylate superplasticizer or perfluorosulfonic acid.

12 Claims, 7 Drawing Sheets

METHOD OF MAKING A NANOCOMPOSITE POLYELECTROLYTE MEMBRANE

BACKGROUND

1. Field

The disclosure of the present patent application relates to the manufacture of membranes for use in hydrogen and methanol fuel cell applications, and particularly to a method of making a nanocomposite polyelectrolyte membrane including dispersing a nanofiller, such as Halloysite nanotubes (HNTs) or polypropylene-grafted maleic anhydride-nano-layered silica (Ma-Si), in a polymer matrix, such as polypropylene (PP).

2. Description of the Related Art

A fuel cell (FC) is an energy storage and conversion device that combines fuel and air to directly produce electrical power. FCs offer high efficiency and are more environment-friendly than other electrical energy producing processes relying on fossil fuels, such as internal combustion engines and gas turbines. If pure hydrogen is used as a fuel in an FC, the only products are heat, electricity, and water. A fuel cell converts chemical energy of the fuel directly to electrical energy.

The most popular and widely used fuel cell is the Polyelectrolyte Membrane Fuel Cell (PEMFC) because of the relatively high efficiency at low temperature and its high power density. A polymer-electrolyte membrane (PEM) is a semipermeable membrane generally made from ionomers and designed to conduct protons while acting as an electronic insulator and reactant barrier; e.g., to oxygen and hydrogen gas. This is their essential function when incorporated into a membrane electrode assembly (MEA) of a proton-exchange membrane fuel cell. The MEA typically includes a catalyst layer, a membrane, a gas diffusion layer, and a microporous layer, which are together referred to as gas diffusion media. There are three main types of PEMFC: those that use pure $H_2$, those that use reformed $H_2$ from methanol or methane or propane using a reformer, and a Direct Methanol Fuel Cell (DMFC) where $H_2$ is being produced without the need for a reformer.

PEMs can be made from either pure polymer membranes or from composite membranes, where other materials are embedded in a polymer matrix. One of the most common and commercially available PEM materials is the fluoropolymer (PFSA) Nafion®, manufactured by DuPont®, where the backbone structure is polytetrafluoroethylene (PTFE). Other structural motifs used to make ionomers for proton-exchange membranes include polyaromatic polymers or partially fluorinated polymers.

The lifetime for unmodified Nafion® is problematic, with a typical lifetime of about 60,000 hours at temperatures below about 90° C., which is presently too limited to make unmodified Nafion® PEMs practical. Further, the cost of Nafion® is prohibitive, with such membranes presently being sold for about $1,000/m². Cost efficient PEMs with enhanced operating temperatures and lifetimes are desirable. Thus, a method of making a nanocomposite polyelectrolyte membrane solving the aforementioned problems is desired.

SUMMARY

The method of making a nanocomposite polyelectrolyte membrane is a process for forming membranes for use in hydrogen and methanol fuel cell applications, for example. A hydrophobic polymer, such as polypropylene, is blended with a nanofiller, such Halloysite nanotubes (HNTs) or propylene-grafted maleic anhydride nano-layered silica (Ma-Si), to form a dry mix, which is then pelletized for extrusion in a twin-screw extruder to form a thin film nanocomposite. The thin film nanocomposite is then annealed and cold stretched at room temperature. The cold stretching is followed by stretching at a temperature of between approximately 110° C. and approximately 140° C. The nanocomposite is then heat set to form the nanocomposite polyelectrolyte membrane. The nanocomposite polyelectrolyte membrane may then be further plasma etched and impregnated with a sulfonated polymer, such as sulfonated melamine formaldehyde, a polycarboxylate superplasticizer or perfluorosulfonic acid.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
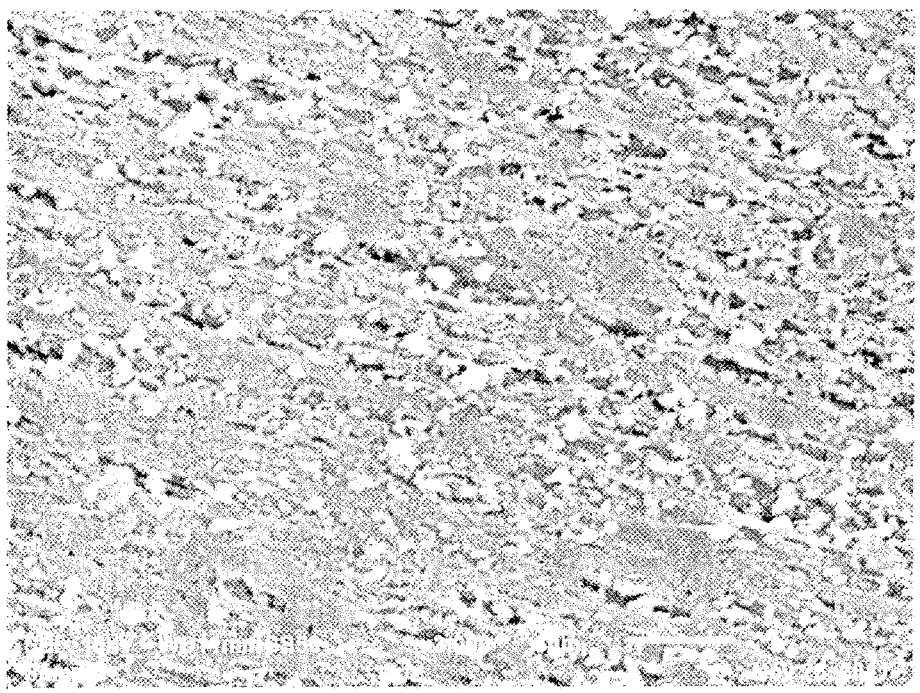
FIG. 1A shows a cross-section scanning electron microscope (SEM) image of nanocomposite polyelectrolyte membrane sample formed from halloysite nanotubes (HNTs) in polypropylene (PP) and etched with argon gas.

A method of making a nanocomposite polyelectrolyte membrane is a process for forming membranes for use in hydrogen and methanol fuel cell applications, for example. The process can include blending a hydrophobic polymer, such as polypropylene (PP), with a nanofiller, such as halloysite nanotubes (HNTs) or propylene-grafted maleic anhydride nano-layered silica (Ma-Si), to form a mixture. Halloysite nanotube is a 1:1 layered alumino-silicate clay having a chemical formula $Al_2O_3\ Si_2O_4\ 4(H_2O)$). The clay includes multi-layers of hollow cylinders formed from alternating layers of alumina and silica. The Ma-Si is a multi-layered smectic clay. The mixture can be pelletized and extruded to form a thin film nanocomposite. The mixture can be extruded using a twin screw extruder, at a temperature of approximately 200° C. A porous mixed-matrix composite can be formed from the thin film nanocomposite using a four-step post-extrusion process.

The four-step post-extrusion process can include annealing the thin film nanocomposite at a high temperature, e.g., approximately 140° C., followed by cold stretching at room temperature, followed by stretching at an elevated temperature, e.g., temperatures ranging from approximately 110° C. to approximately 140° C., and finally heat setting at an elevated temperature, e.g., approximately 145° C., to form the nanocomposite polyelectrolyte membrane. The nanocomposite polyelectrolyte membrane may then be further plasma etched and impregnated with a sulfonated polymer, such as sulfonated melamine formaldehyde, a polycarboxylate superplasticizer or perfluorosulfonic acid.

Plasma etching is performed with argon gas to activate the surface of the stretched films. As will be described in greater detail below, membrane samples were etched by argon plasma gas for 30 minutes with 100 W of radio frequency (RF) power. The chamber pressure where the membrane samples were treated was 200 mTorr. The argon gas flow rate was maintained at 15 sccm.

For the impregnation of the stretched and plasma etched porous membrane samples, the membranes, prepared as described above, were each immersed in ethanol for 30 minutes at room temperature, after which they were dried in an oven at 60° C. for one hour. The ethanol was used to convert the polypropylene nanocomposite samples from hydrophobic to hydrophilic films. After the samples were dried, they were immersed in several polymer solutions for impregnation at room temperature for one hour. The samples were then dried in an oven at 60° C. for one hour. The polymer solutions that were used for impregnation included Nafion® perfluorinated resin solutions (5 wt % in lower aliphatic alcohols and water, containing 15-20% water with a viscosity of 10 cP at 25° C.), sulfonated melamine formaldehyde (SMF: 20% concentration and with viscosity of 4.42 cP at 25° C.) and polycarboxylate superplasticizers (PCS: 40% concentration and with viscosity of about 11 cP at 25° C.). The same procedure was followed for commercial polypropylene membranes, namely, Celgard® 2500 and Celgard® 2400 samples. The Nafion® perfluorinated resin solution was used as received. The new weight of the impregnated samples and their thicknesses were then measured and recorded before and after impregnation. The same procedure was used for samples that were plasma etched with argon gas and for samples that were not plasma etched.

As will be described in greater detail below, the impregnated samples were then tested for their mechanical, physical and morphological properties. Performance evaluation with regard to their proton conductivity and permeability to methanol and nitrogen gas were also carried out. A material testing machine with an attached environment chamber, manufactured by Testometric Co. Ltd. of the United Kingdom, was used to prepare the post-extrusion processing of the various nanocomposite films and to test their mechanical properties, including tensile strength, yield stress, modulus of elasticity and percent elongation at different temperatures and different rates according to the American Standard ASTM D-882-10 (2010).

Scanning electron microscopy analysis of the nanocomposite membranes was conducted on a JSM-6010LA InTouchScope multiple touch panel scanning electron microscope, manufactured by Jeol® Ltd. of Japan. All nanocomposite membranes were cut in small pieces of approximately 5 mm×10 mm and were placed on double-sided tape, followed by gold sputter-coating. Coatings were applied for 60 s at 15 mA. This deposition produced gold coatings that were approximately 4 nm thick. The images were taken at 5 keV and a magnification of 3000.

Methanol flux was measured using a Sterlitech® HP4750 high-pressure stirred cell. Measurements were carried out at room temperature. The membrane size was 49 mm with an active area of 14.6 cm$^2$. Methanol flux was carried out at a pressure of 145 psi. The processing volume was up to 300 mL, with a maximum pressure of up to 1000 psig with high-pressure clamps. A nitrogen and oxygen gas permeameter was used to measure the nitrogen permeability for the samples, both before and after impregnation, at a pressure ranging from 0.0 to 500 psi.

The impregnated samples with various polymeric solutions were measured for their proton conductivity using a TrueXessory-PCM measuring device, manufactured by FuelCon of Germany. To allow a reproducible measurement of the proton conductivity under real conditions, the TrueXessary-PCM measuring device provides a cell that operates under well-defined humidity and temperature up to 200° C. Proton conductivity measurement (PCM) follows two different measuring principles, namely, in-plane measurement and through-plane measurement. To lower contact resistance influences and achieve higher reproducibility, the TrueXessary-PCM measuring device uses an in-plane 4-electrode conductivity method.

The following examples illustrate the present teachings.

Example 1

Table 1 below summarizes exemplary extrusion conditions for all of the tested blends with loadings of nanomaterials of HNTs and Ma-Si with PP. These loadings gave the percent loading of HNTs in the final nanocomposite film as 0.0% (sample 18), 12.0% (sample 1E) and 15.0% (sample 1F), respectively. Here, the percentage is in comparison, by weight, to the amount of polypropylene (PP). Additionally, one blend for polypropylene with maleic anhydride-silica (PP/Ma-Si) was prepared (sample 6-1, with 15% Ma-Si in the film). These extrusion conditions were used because the best results were obtained for sample 18 with 0% loading of nanomaterials with PP (0.0% HNT and 0% Ma-Si) in the film under these conditions, as shown in Table 1. The resulting extruded film from sample 18 was smooth with a uniform final film thickness ranging from 0.05 to 0.06 mm and with no gel-like bubbles formed. The preferred extruder settings were mostly the melt temperature of the polymer blends, which was 200° C., the screw feed speed of 11 rpm, the screw rotational speed of 32 rpm, and the drawdown ratio of about 12.07. The drawdown ratio of 12.07 was obtained with a casting roller speed of 3.5 rpm, an extrusion rate of about 0.29 m/min, and a haul-off roller speed of about 4.1 m/min. These extrusion conditions were found to be suitable for nearly all blends with a slight modification of settings for sample 6-1, as can be seen below in Table 1.

TABLE 1

Extrusion Parameters for Sample Blends

| | | Sample No. | | | |
|---|---|---|---|---|---|
| | | 18 | 6-1 | 1E | 1F |
| | | % HNT or % Ma-Si compared against PP (by weight) | | | |
| | Unit | 0.0% | 15% Ma-Si | 12% HNT | 15% HINT |
| Extruder temperature | ° C. | 200 | 200 | 200 | 200 |
| Feed screw rotational speed | RPM | 11 | 13 | 11 | 12 |
| Twin screw rotational speed | RPM | 32 | 33 | 32 | 32 |
| Pressure | bar | 45 | 65 | 45 | 55 |
| Die slit thickness | mm | 0.8 | 0.8 | 0.8 | 0.8 |
| Width of die slot | cm | 15 | 15 | 15 | 15 |
| Film width at exist | cm | 15 | 15 | 15 | 15 |
| Temperature of melt | ° C. | 175 | 175 | 178 | 178 |
| Distance from die-to-casting roller | cm | 5.5 | 5.5 | 5.5 | 5.5 |
| Casting roller temperature | cm | 80 | 80 | 80 | 80 |
| Casting roller linear speed | m/min | 3.5 | 4.0 | 3.5 | 3.5 |
| Extrusion linear speed | m/min | 0.29 | 0.41 | 0.275 | 0.28 |
| Drawdown ratio | | 12.07 | 9.76 | 12.73 | 12.5 |
| Haul-off roller linear speed | m/min | 4.1 | 4.6 | 4.1 | 4.1 |
| Film initial thickness | mm | 0.8 | 0.8 | 0.8 | 0.8 |
| Film final thickness | mm | 0.05-0.06 | 0.07-0.08 | 0.06-0.07 | 0.07-0.09 |
| Film original width | cm | 15 | 15 | 15 | 15 |
| Film final width | cm | 11.5 | 11 | 11 | 11 |

Example 2

Table 2 below shows the mechanical properties of the nanocomposite films before post-extrusion processing. The data show that as the percent of HNT nanomaterial increases from 0.0% to 15% in the nanocomposite (PP/HNT), all of the mechanical properties, such as tensile strength, elongation at break, yield stress and Young's modulus decrease modestly, compared with Ma-Si, which decreases quite significantly. For example, the data show that these properties decrease more significantly when the nanomaterial used with PP is Ma-Si instead of HNTs, where the tensile strength and percent elongation decrease by about 124% in tensile strength and about 235% in percent elongation at break. For example, 15% Ma-Si in the nanocomposite (sample 6-1) decreases the tensile strength of the nanocomposite from 51.9 N/mm$^2$ (sample 18) to 14.7 N/mm$^2$, and decreases the percent elongation from 685.6% to 306.2%, compared with 0.0% loading of Ma-Si in the nanocomposite, as shown in sample 18. On the other hand, the loading of HNT nanomaterial with PP shows a much smaller effect on the reduction of the mechanical properties, as can be seen in Table 2. For example, a loading of HNT of 12% (sample 1E) decreases the tensile strength and percent elongation by 43.3% and 10.8%, respectively. Similarly, for sample 1F with an HNT loading of 15%, the tensile strength and percent elongation decrease by 47.4% and 5.6%, respectively. These effects are due to the physical structure of the nanomaterials, where HNTs are hollow tubes while Ma-Si nanomaterials are platelets.

TABLE 2

Mechanical Properties of HNT/PP and Ma-Si/PP before Post-Extrusion Stretching

| Sample | Nano-material (%) | Tensile strength (N/mm$^2$) | Elongation at Break (%) | Yield Stress (N/mm$^2$) | Young's Modulus (N/mm$^2$) |
|---|---|---|---|---|---|
| 18 | 0.0 | 51.9 | 685.6 | 23.4 | 1297.0 |
| 1E | 12-HNT | 29.4 | 611.4 | 18.9 | 1108.0 |
| 1F | 15-HNT | 27.3 | 646.9 | 17.8 | 997.0 |
| 6-1 | 15-Ma-Si | 14.7 | 306.2 | 14.1 | 877.4 |

Table 3 below shows the mechanical properties of HNT/PP and Ma-Si/PP nanocomposites after they have been exposed to post-extrusion processing. Further, Table 3 shows some of the properties for other commercial samples, such as a commercial perfluorinated polymer electrolyte membrane (PEM) made from Nafion® 117, and commercial polypropylene membranes made from Celgard® 2400 and Celgard® 2500.

As shown in Table 3, the post-extrusion stretching can facilitate producing microporous nanocomposite samples with good mechanical and physical properties. Post-extrusion stretching for sample 6-1 is 20% cold-stretching followed by 80% hot-stretching at 140° C., while for samples 18, 1E, and 1F, the post-extrusion stretching is 20% cold-stretching followed by 150% hot stretching at 140° C. The post-extrusion processing is more efficient in increasing the tensile strength of samples when a restrained cold stretching at RT of about 20% is combined with a restrained hot stretching of about 150% at 140° C., where the tensile strength increases by a factor of more than 2.3, 2.98, 2.58, and 1.43 for samples 18 (0.0% nanomaterial), 1E (12% HNT), 1F (15% HNT) and 6-1 (15% Ma-Si), respectively. Additionally, Table 3 shows that the tensile strength of these samples exceeds the strength of the commercial PEM Nafion® 117 sample quite significantly, by almost a factor of 2, while the Young's modulus is almost the same. The tensile strength of the Nafion® 117 membrane is 43 N/mm$^2$, compared to 70.47 N/mm$^2$ and 87.54 N/mm$^2$ for samples 1F and 1E, respectively.

However, the inclusion of nanomaterials such as HNTs and Ma-Si in polypropylene significantly improves the other properties of the nanocomposite, including its morphology, pore size and pore size distribution, along with mass transfer of liquids and gases and their electrolyte conductivity. Samples loaded with HNTs give significantly higher tensile strength measurements, by a factor of 3.5 to 4, than those loaded with Ma-Si when these samples are exposed to post-extrusion processing, compared to only a factor of 2 for samples without post-extrusion processing. The effect of post-extrusion processing on the percent elongation is almost the same for nanocomposite samples with both HNTs and Ma-Si, where the percent elongation gets reduced quite significantly. Celgard® 2400 and Celgard® 2500 commercial polypropylene membranes have a tensile strength of about 139.2 N/mm² and 103.4 N/mm², respectively, and an elongation at break of about 40% and a tensile modulus of 1380 N/mm² (for Celgard® 2400).

TABLE 3

Mechanical Properties of PP-Nanocomposites with Different Percentages of HNTs and Ma-Si after Post-Extrusion Processing

| Sample | Nano-material % | Tensile Strength N/mm² | Elongation at Break % | Yield stress N/mm² | Young's Modulus N/mm² |
|---|---|---|---|---|---|
| 18 | 0.0 | 119.67 | 56.93 | 25.56 | 426.84 |
| 1E | 12-HNT | 87.54 | 34.43 | 18.9 | 256.82 |
| 1F | 15-HNT | 70.47 | 33.31 | 15.33 | 222.15 |
| 6-1 | 15-Ma-Si | 21.03 | 38.93 | 8.80 | 281.68 |
| Nafion ® 117 | 0.0 | 43.00 | 225.00 | — | 249.00 |
| Celgard ® 2500 | 0.0 | 103.39 | — | — | — |
| Celgard ® 2400 | 0.0 | 139.16 | 40.0 | — | 1380 |

Example 3

Figure 1B:
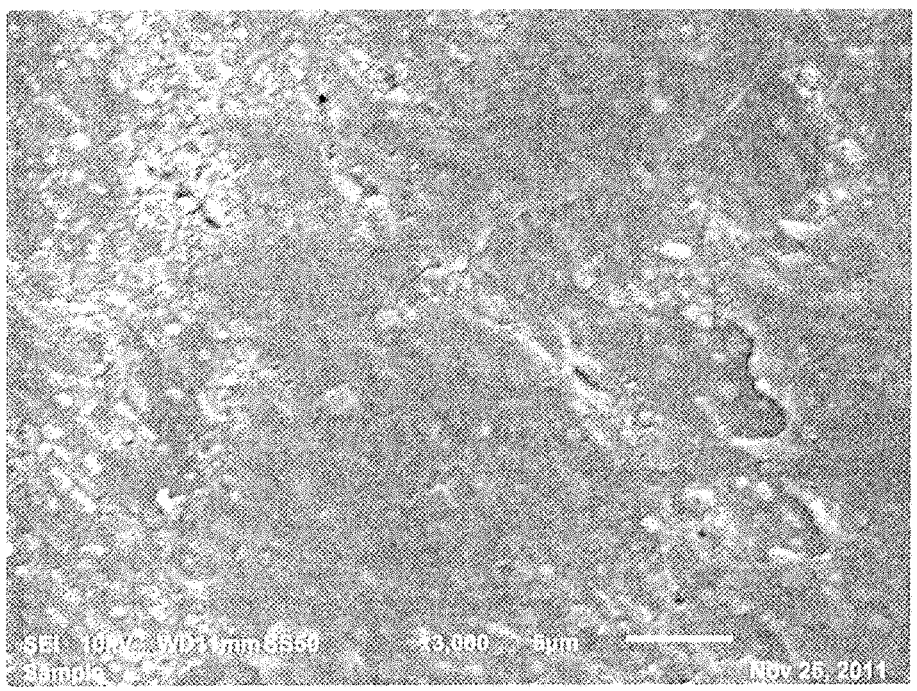
FIG. 1B shows a cross-section scanning electron microscope (SEM) image of a nanocomposite polyelectrolyte membrane sample similar to that of FIG. 1A, but further coated with a Nafion® solution.
Figure 1C:
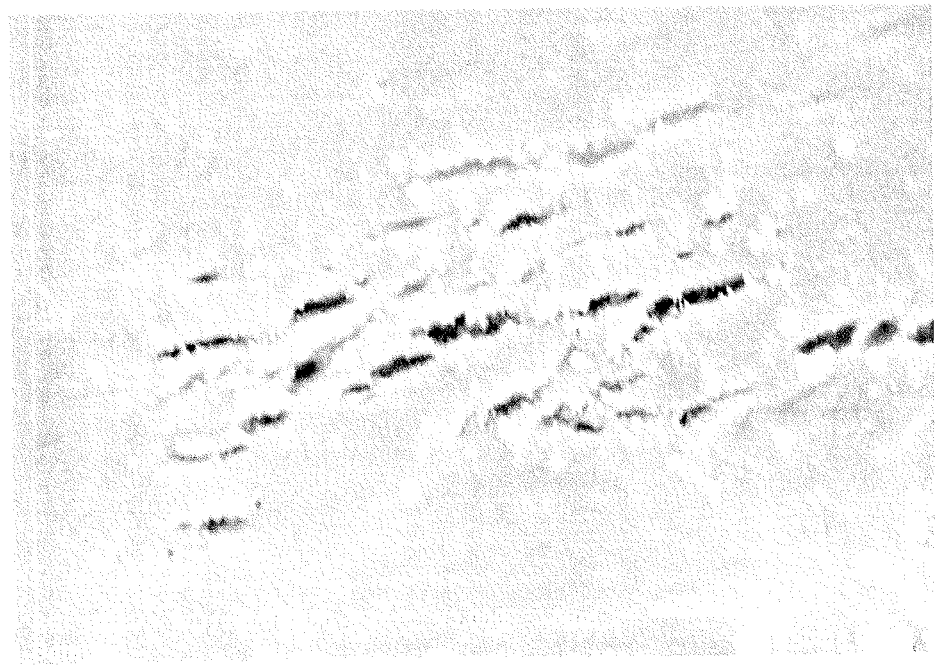
FIG. 1C shows a cross-section scanning electron microscope (SEM) image of a nanocomposite polyelectrolyte membrane sample similar to that of FIG. 1A, but further coated with a polycarboxylic superplasticizer (PCS) solution.
Figure 1D:
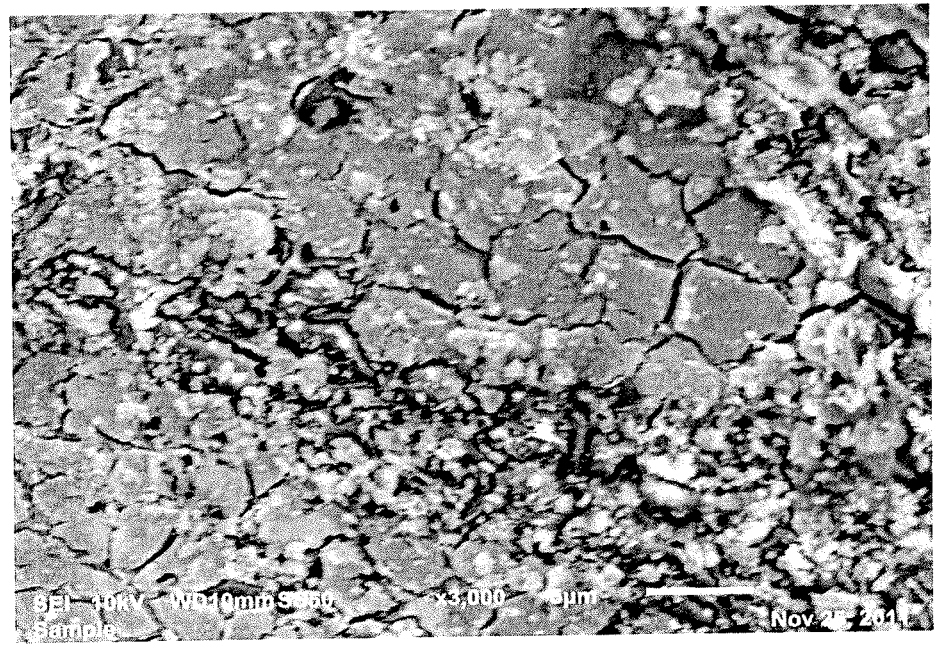
FIG. 1D shows a cross-section scanning electron microscope (SEM) image of a nanocomposite polyelectrolyte membrane sample similar to that of FIG. 1A, but further coated with a sulfonated melamine formaldehyde (SMF) solution.

FIG. 1A shows a cross-section scanning electron microscope (SEM) image of membrane sample $1F_1$ (PP/15% HNT) that was etched with argon gas but not coated with any further materials. FIG. 1B shows a similar membrane sample ($1F_2$) which was etched and coated with Nafion® solution. FIG. 1C shows a sample ($1F_3$) which was etched and coated with polycarboxylic superplasticizer (PCS) solution. FIG. 1D shows a sample ($1F_4$) which was etched and coated with sulfonated melamine formaldehyde (SMF) solution. The coating with the Nafion® and SMF solutions appear to cover most, if not all, of the slit-like voids and pores of the membrane. However, the coating with PCS appears to not fill all of the slit-like voids. Tables 4 and 5 below show the percent thickness uptake and percent weight uptake for samples $1F_{1-4}$ (PP/15% HNT). The data in Tables 4 and 5 show that although the PCS has the highest concentration among the impregnating solutions and the highest percent uptake of thickness and weight, the SEM shows that the slit-like formation of the nanocomposite membranes was not covered completely, compared to the other two solutions, namely, Nafion® and SMF solutions.

Figure 2A:
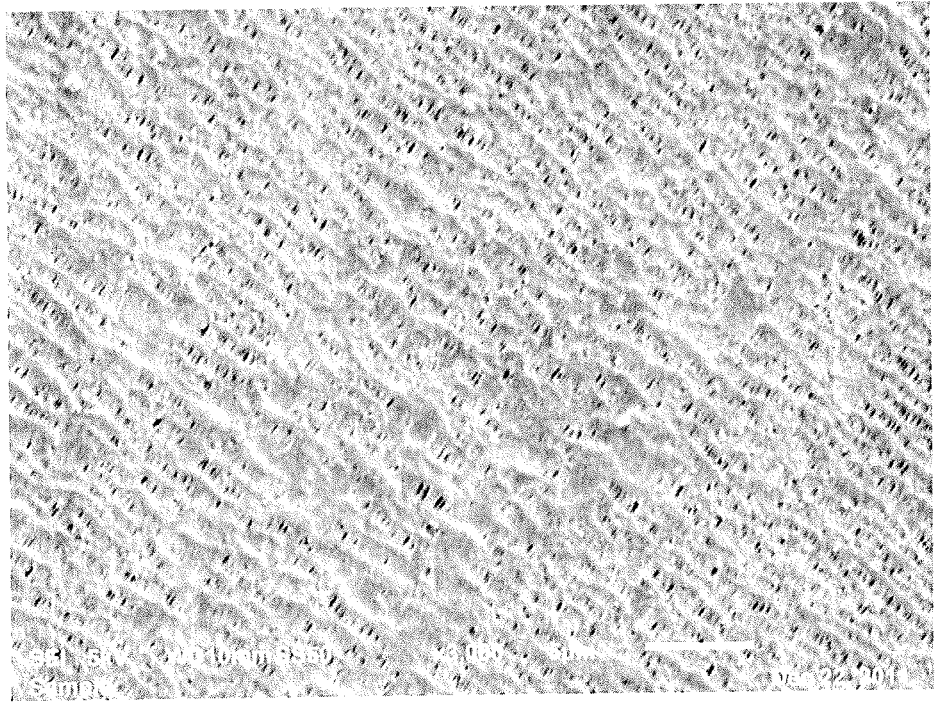
FIG. 2A shows a cross-section scanning electron microscope (SEM) image of a conventional, commercially available Celgard® 2400 membrane sample etched with argon gas.
Figure 2B:
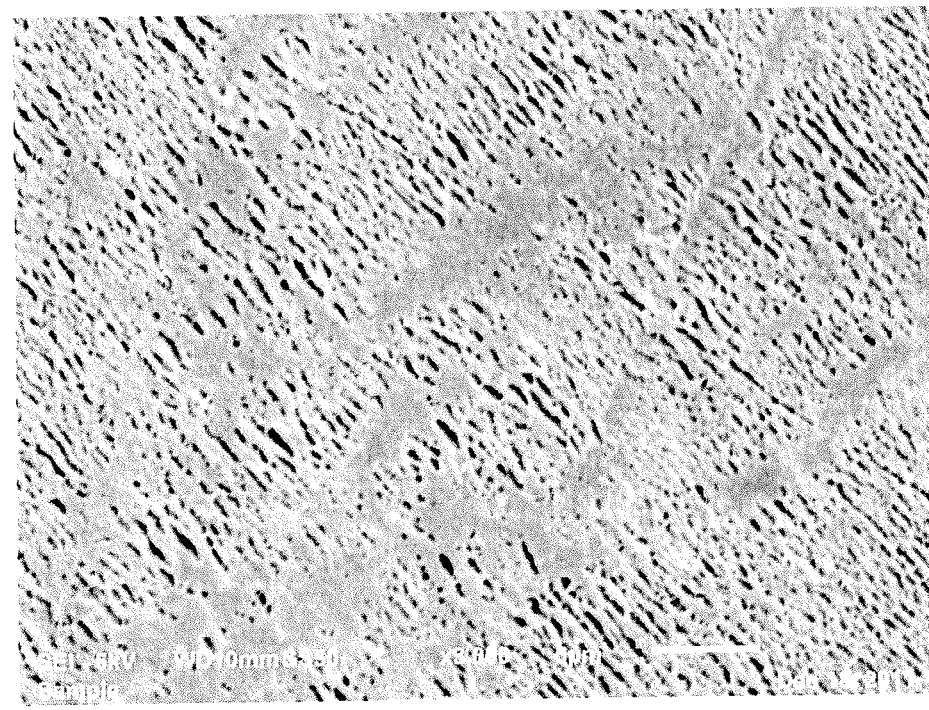
FIG. 2B shows a cross-section scanning electron microscope (SEM) image of the conventional, commercially available Celgard® 2400 membrane sample of FIG. 2A, but further coated with a Nafion® solution.
Figure 2C:
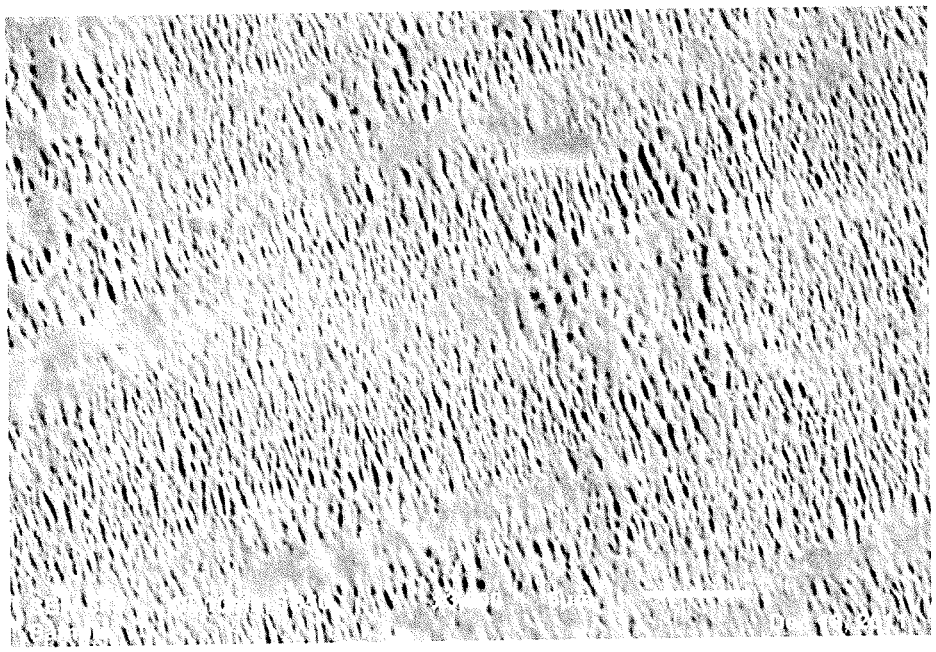
FIG. 2C shows a cross-section scanning electron microscope (SEM) image of the conventional, commercially available Celgard® 2400 membrane sample of FIG. 2A, but further coated with a polycarboxylic superplasticizer (PCS) solution.
Figure 2D:
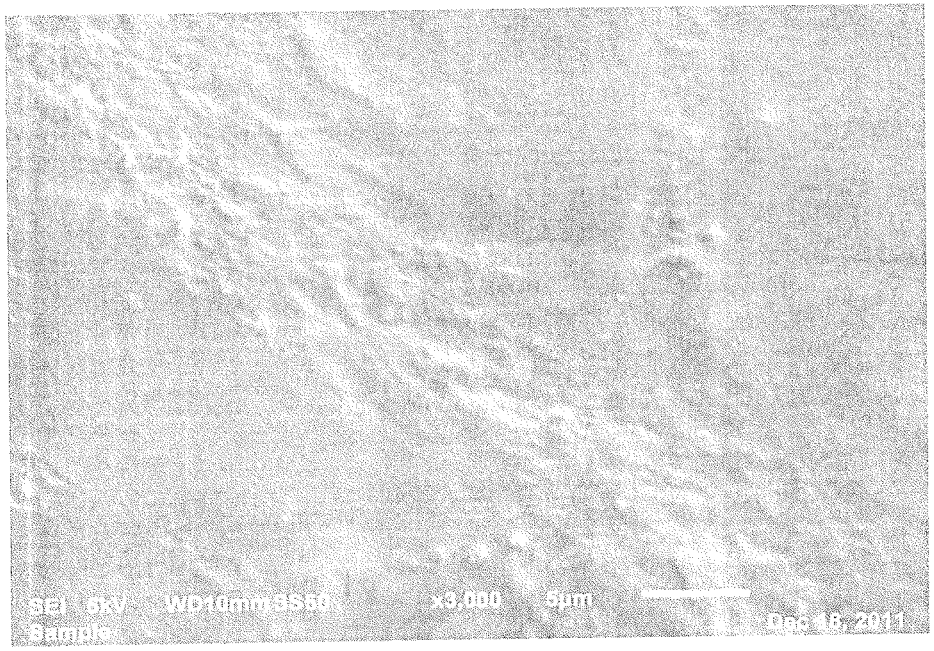
FIG. 2D shows a cross-section scanning electron microscope (SEM) image of the conventional, commercially available Celgard® 2400 membrane sample of FIG. 2A, but further coated with a sulfonated melamine formaldehyde (SMF) solution.
Figure 3A:
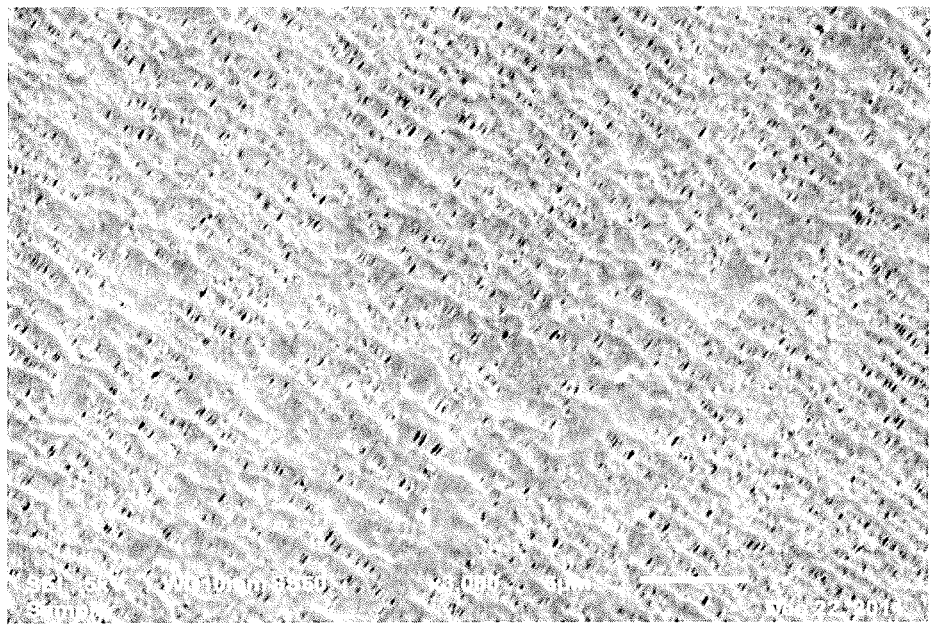
FIG. 3A shows a cross-section scanning electron microscope (SEM) image of a conventional, commercially available Celgard® 2500 membrane sample etched with argon gas.
Figure 3B:
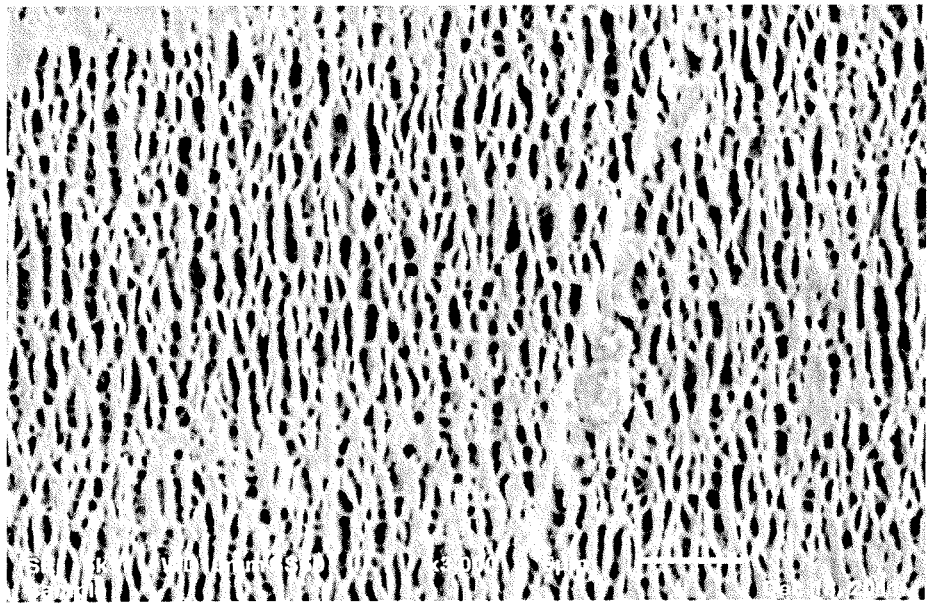
FIG. 3B shows a cross-section scanning electron microscope (SEM) image of the conventional, commercially available Celgard® 2500 membrane sample of FIG. 2A, but further coated with a Nafion® solution.
Figure 3C:
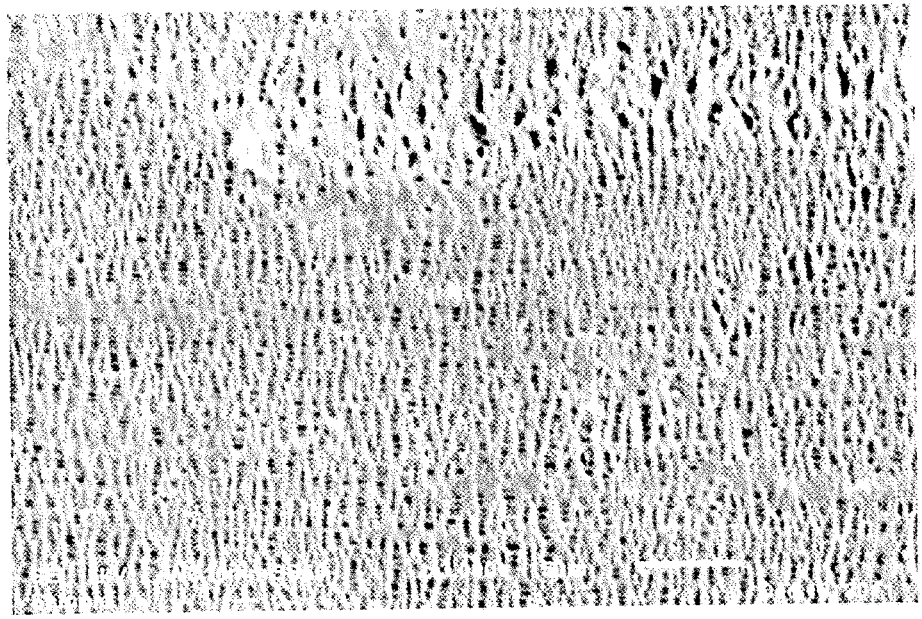
FIG. 3C shows a cross-section scanning electron microscope (SEM) image of the conventional, commercially available Celgard® 2500 membrane sample of FIG. 2A, but further coated with a polycarboxylic superplasticizer (PCS) solution.
Figure 3D:
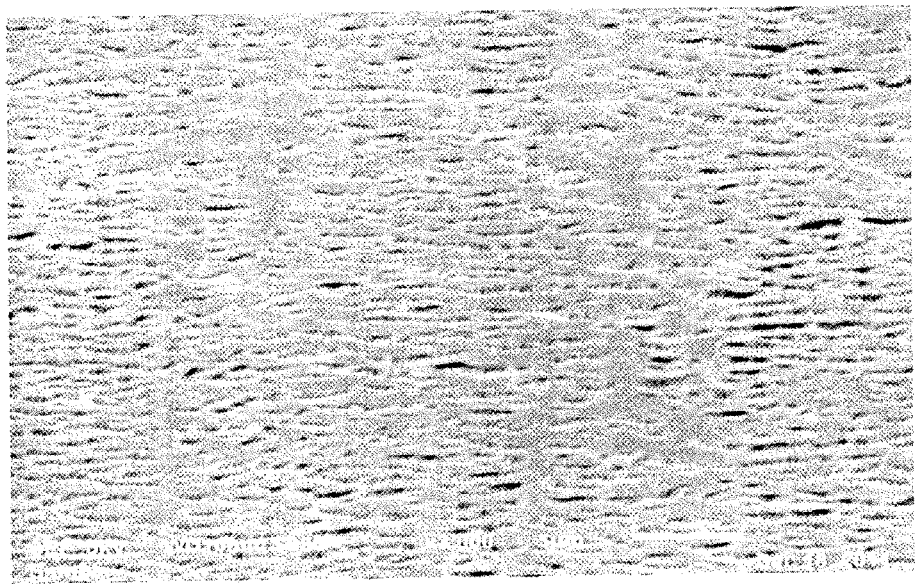
FIG. 3D shows a cross-section scanning electron microscope (SEM) image of the conventional, commercially available Celgard® 2500 membrane sample of FIG. 2A, but further coated with a sulfonated melamine formaldehyde (SMF) solution.

FIG. 2A shows a cross-section scanning electron microscope (SEM) image of a Celgard® 2400 membrane sample that was etched with argon gas but not coated with any further materials. FIG. 2B shows a similar membrane sample which was etched and coated with Nation® solution. FIG. 2C shows a similar sample which was etched and coated with polycarboxylic superplasticizer (PCS) solution. FIG. 2D shows a Celgard® 2400 membrane sample which was etched and coated with sulfonated melamine formaldehyde (SMF) solution. Similarly, FIG. 3A shows a cross-section scanning electron microscope (SEM) image of a Celgard® 2500 membrane sample that was etched with argon gas but not coated with any further materials. FIG. 3B shows a similar membrane sample which was etched and coated with Nafion® solution. FIG. 3C shows a similar sample which was etched and coated with polycarboxylic superplasticizer (PCS) solution. FIG. 3D shows a Celgard® 2500 membrane sample which was etched and coated with sulfonated melamine formaldehyde (SMF) solution. As shown for each sample, the coating with Nafion® and PCS appear not to fully cover the slit-like voids or pores, while in the case of SMF, it was fully covered. Further, it should be noted that the concentrations and viscosities of the impregnating solutions were different, whereas for the Nafion® solution, the concentration was 5 wt % in lower aliphatic alcohols and contains 15-20% water, with a viscosity of 10-40 cP at 25° C., while for PCS, the concentration was 40% with a viscosity of 11 cP at 25° C. For SMF, the concentration was 20%, with a viscosity of about 4.42 cP at 25° C. While SMF has the lowest viscosity, it appears that full coating was more feasible than with the other two solutions, as can be seen from FIGS. 2A-D, 3A-D, 4A and 4B.

Figure 4A:
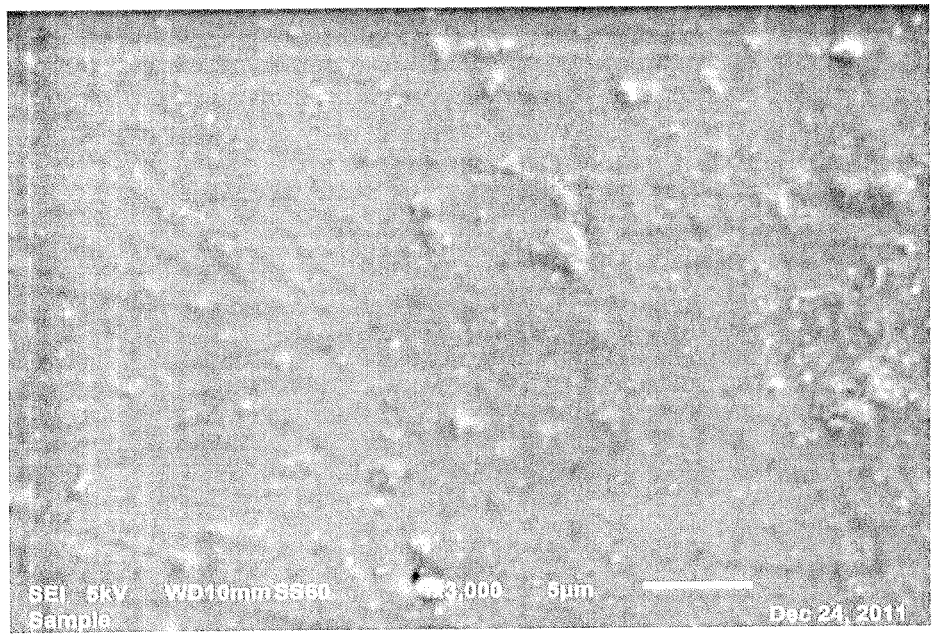
FIG. 4A is a cross-section SEM image of a conventional, commercially available Nafion® polymer-electrolyte membrane (PEM) sample made from Nafion® 115.
Figure 4B:
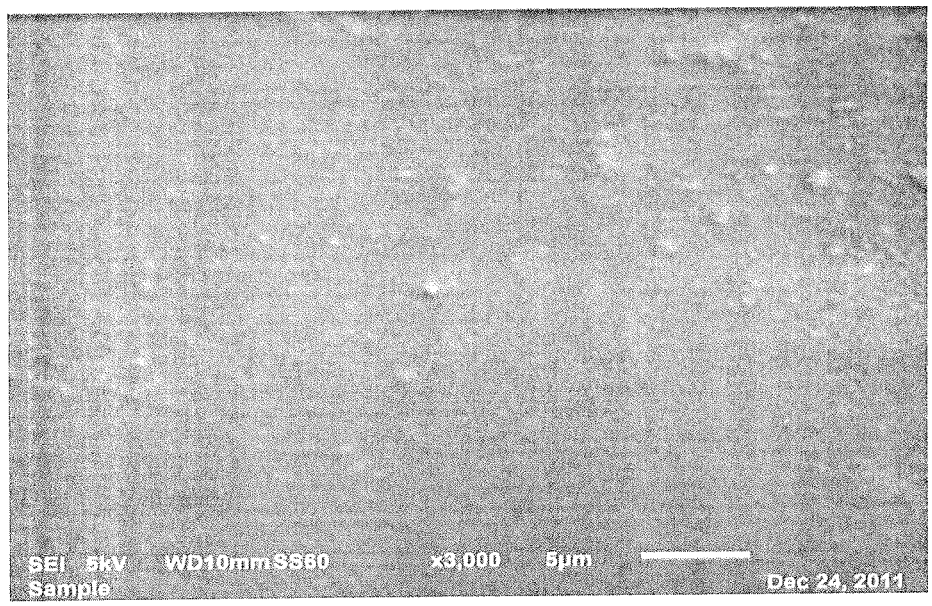
FIG. 4B is a cross-section SEM image of a conventional, commercially available Nafion® polymer-electrolyte membrane (PEM) sample made from Nafion® 117.

FIG. 4A is a cross-section SEM image of a commercial Nafion® PEM membrane sample made from Nafion® 115. FIG. 4B is a cross-section SEM image of a commercial Nafion® PEM membrane sample made from Nafion® 117. The images (with a magnification of 3000) do not show any pore formation in the commercial Nafion® PEM membranes.

TABLE 4

Thickness and percent Thickness Uptake of Etched Samples ($1F_1$ – $1F_4$: PP/15% HNT) Before and After Impregnation (mm)

| Samples | Original Thickness | Impregnated in Nafion ® | Impregnated in PCS | Impregnated in SMF |
|---|---|---|---|---|
| $1F_1$ | 0.034 | — | — | — |
| % Thick. Uptake | — | — | — | — |
| $1F_2$ | 0.057 | 0.069 | — | — |
| % Thick. Uptake | — | 21.1% | — | — |
| $1F_3$ | 0.085 | — | 0.112 | — |
| % Thick. Uptake | — | — | 31.8% | — |
| $1F_4$ | 0.088 | — | — | 0.101 |
| % Thick. Uptake | — | — | — | 14.8% |

TABLE 5

Weight and Percent Weight Uptake of Etched Samples ($F_1$ – $F_4$: PP/15% HNT) Before and After Impregnation (mg)

| Samples | Original Weight (mg) | Impregnated in Nafion ® | Impregnated in PCS | Impregnated in SMF |
|---|---|---|---|---|
| $1F_1$ | 58.0 | — | — | — |
| % Wt. Uptake | — | — | — | — |
| $1F_2$ | 53.8 | 68.9 | — | — |
| % Wt. Uptake | — | 28.1% | — | — |
| $1F_3$ | 70.6 | — | 128.2 | — |
| % Wt. Uptake | — | — | 81.6% | — |
| $1F_4$ | 91.2 | — | — | 110.1 |
| % Wt. Uptake | — | — | — | 20.7% |

Example 4

Pore size and pore size distribution measurements were made according to ASTM F316-03 (2003) for some microporous nanocomposite samples loaded with 0.0% HNT (sample 18), 15% HNT (sample 1F) and 15% Ma-Si (sample 6-1), respectively. Sample 18, with no nanomaterial loading, shows a narrow pore size distribution, ranging from a minimum of 0.0197 μm to a maximum pore diameter of 0.0297 μm with a mean pore size of 0.0297 μm. Sample 1F, with 15% HNT loading, has a pore size distribution ranging from a minimum of 0.0225 μM to a maximum pore diameter of 0.0477 μm with a mean pore size of 0.0366 μm. Sample 6-1, with a 15% loading of Ma-Si, has a pore size distribution ranging from a minimum of 0.0193 μm to a maximum pore diameter of 0.0253 μm with a mean pore size of 0.0236 μm. By comparison, the Celgard® 2400 and Celgard® 2500 samples have a porosity of 41% and 55%, with pore sizes of 0.043 μm and 0.064 μm, respectively.

The methanol flux for samples 18, 1F, 1E, and 6-1 before impregnation was measured at room temperature using the Sterlitech® HP4750 high-pressure stirred cell at a pressure of 145 psi. The sample results were 8.2 kg/m$^2$h, 750 kg/m$^2$h, 280 kg/m$^2$h and 171 kg/m$^2$h, respectively. This shows that the flux of methanol in HNT-loaded samples is about four times as high as that for the Ma-Si loaded samples at the same applied pressure of 145 psi. The methanol flux for commercial Celgard® 2400 was reported to range from 117.12 to 458.3 kg/m$^2$h, when tested under a pressure of 80 psi using a pressure cell with nitrogen cylinder, compared to 6.5 kg/m$^2$h for sample 18, about 400 kg/m$^2$h for sample 1F, 150 kg/m$^2$h for sample 1E, and about 90 kg/m$^2$h for sample 6-1, when measured at the same pressure of 80 psi.

Example 5

The TrueXessory-PCM measuring device, manufactured by FuelCon of Germany, was used to measure the proton conductivity of the prepared polyelectrolyte membranes (PEM). The device provides highly reproducible in-plane measurement of the proton conductivity, under real conditions, at temperatures ranging from ambient up to 200° C. The device includes an impedance spectroscopy analyzer and a 4-electrode sample holder designed for membranes with a typical geometry of 1.5 cm×4.0 cm. Proton conductivity measurement follows two different measuring principles, namely, in-plane measurement and through-plane measurement. To lower contact resistance influences and achieve higher reproducibility, the TrueXessory-PCM uses the in-plane 4-electrode conductivity method. The 4-electrode method is more reliable and gives reproducible data. The conductivity was measured at 50° C. and 50% relative humidity. The resistance (R) was measured at two frequencies ranging from 10,000 Hz to 10 Hz, and 10,000 Hz to 1 Hz.

Table 6 below shows the original thickness and percent thickness uptake of the samples before and after impregnation with the three polymeric solutions after they have been exposed to argon gas etching for 30 min. Table 6 also shows the proton conductivity at 50° C. and 50% relative humidity, with a frequency of 10,000 Hz to 10 Hz, and 10,000 Hz to 1 Hz. The samples were immersed in deionized water for 24-96 hours prior to measuring the proton conductivity. The results show that, in general, the percent thickness uptake was highest for samples impregnated with PCS. This is expected, since PCS has the highest concentration and the highest viscosity compared with the other two polymer solutions. At 25° C., Nafion® perfluorinated resin solution (5 wt % in lower aliphatic alcohols, containing 15-20% water) has a viscosity of 10 cP, the PCS concentration is 40% with a viscosity of 11 cP, and the SMF concentration is 20% with a viscosity of 4.42 cP. The membrane sample dimensions used for measurement of proton conductivity were a length (L) of 6 cm and a width (W) of 5 cm. The weight percent uptake follows almost the same trend, as can be seen in Table 7.

Tables 6 and 7 also show that sample 6-1 (15% Ma-Si loading with PP) has almost the lowest thickness and weight percent uptake, which may be attributed to the low pore size and pore size distribution. The proton conductivity is also shown for these samples in Table 7. Although samples coated with PCS got the highest thickness and weight percent uptake of the impregnating solutions, they did not give the highest proton conductivity when compared with samples coated with the Nafion® and SMF solutions. Additionally, the samples impregnated with the Nafion® solution gave the lowest conductivity (samples 1E, 18 and 6-1), while SMF gave the highest conductivity for these samples. Sample 6-1 gave the lowest conductivity of these samples. The Celgard® 2500 and Celgard® 2400 samples gave the highest conductivity when they were coated with Nafion® solution. Table 7 shows that the conductivity for Celgard® 2500 is 0.0391-0.0155 S/cm, and for Celgard® 2400 is 0.0186-0.0340 S/cm (coated with Nafion® solution), compared to what is reported in the literature, where Celgard® 2500 is 0.027 S/cm and Celgard® 2400 is 0.021 S/cm at 65° C. (where these samples were also coated with 43-45 wt % uptake of Nafion®. Further, Celgard® 2500 has a pore size of 0.064 mm and a porosity of 55%, compared to Celgard® 2400, which has a pore size of 0.043 mm and a porosity of 41%, respectively. The Nafion® 115 and 117 commercial polyelectrolyte membranes gave the highest conductivity, ranging between 0.0811 S/cm and about 0.0931 S/cm, respectively. It should also be noted that sample 1E (12% HNT with PP) coated with SMF gave the highest conductivity of 0.0423 S/cm, compared with Nafion® coating, which had a conductivity of 6.18×10$^{-5}$ S/cm, and compared with PCS coating, where the conductivity was 0.0297 S/cm (tested at a frequency of 10,000 Hz-10 Hz).

TABLE 6

Proton Conductivity of Argon-Etched and Impregnated Samples at 50° C. and 50% Relative Humidity

| Sample | Original Thickness (mm) | Impregnated in Nafion ® | Impregnated in PCS | Impregnated in SMF |
|---|---|---|---|---|
| Celgard ® 2500 | 0.025 | 0.030 | 0.114 | 0.055 |
| % Thick. uptake | — | 20.0% | 356.0% | 120.0% |
| DI-water (hr.) | | 24 | 24 | 24 |
| Conductivity (S/cm) | | 0.0391-0.0155 | 0.0134-0.0177 | 0.0155-0.0094 |
| Celgard ® 2400 | 0.025 | 0.039 | 0.036 | 0.029 |
| % Thick. uptake | — | 56.0% | 44.0% | 16.0% |

TABLE 6-continued

Proton Conductivity of Argon-Etched and Impregnated Samples at 50° C. and 50% Relative Humidity

| Sample | Original Thickness (mm) | Impregnated in Nafion ® | Impregnated in PCS | Impregnated in SMF |
|---|---|---|---|---|
| DI-water (hr) | — | 24 | 24 | 24 |
| Conductivity (S/cm) | — | 0.0186-0.0340 | 0.0232-0.0202 | $2.2 \times 10^{-4}$-$1.3 \times 10^{-5}$ |
| IE (12% HNT) | 0.056 | 0.060 | 0.073 | 0.068 |
| % Thick. uptake | — | 7.1% | 30.4% | 21.4% |
| DI-water (hr) | — | 24 | 24 | 24 |
| Conductivity (S/cm) | — | $6.18 \times 10^{-5}$-$7.01 \times 10^{-6}$ | 0.0297-0.0408 | 0.0423-0.01173 |
| 18 (0% HNT) | 0.024 | 0.025 | 0.036 | 0.032 |
| % Thick. uptake | — | 4.2% | 50.0% | 33.3% |
| DI-water, (hr.) | — | 96 | 96 | 96 |
| Conductivity (S/cm) | — | $6.7 \times 10^{-5}$-$1.11 \times 10^{-5}$ | 0.0233-0.0345 | 0.0381-0.0411 |
| 6-1(15% Ma-Si) | 0.13 | 0.140 | 0.139 | 0.144 |
| % Thick. Uptake | — | 7.7% | 6.9% | 10.8% |
| DI-water, (hr.) | — | 24 | 24 | 24 |
| Conductivity (S/cm) | — | $4.82 \times 10^{-6}$-$9.78 \times 10^{-7}$ | 0.0146-$4.4 \times 10^{-3}$ | 0.015-$3.8 \times 10^{-3}$ |
| DI-water, (hr.) | — | — | 96 | — |
| Conductivity (S/cm) | — | — | 0.0146-0.0121 | — |
| Nafion ® 115 | 0.127 | — | — | — |
| DI-water, (hr.) | 96 | — | — | — |
| Conductivity (S/cm) | 0.0811-0.0788 | — | — | — |
| Nafion ® 117 | 0.183 | — | — | — |
| DI-water (h) | 24 | — | — | — |
| Conductivity (S/cm) | 0.105-0.017 | — | — | — |
| DI-Water (hr.) | 96 | — | — | — |
| Conductivity. (S/cm) | 0.093-0.0935 | — | — | — |

TABLE 7

Percent Weight Uptake of Argon-Etched Samples Before and After Impregnation

| Samples | Original weight (mg) | Impregnated in Nafion ® | Impregnated in PCS | Impregnated in SMF |
|---|---|---|---|---|
| Celgard ® 2500 | 28.8 | 47.5 | 113.2 | 32.7 |
| % weight uptake | — | 64.9% | 293.0% | 13.54% |
| Celgard ® 2400 | 24.4 | 32.8 | 96.7 | 36.9 |
| % weight uptake | — | 34.4% | 296.3% | 51.2% |
| IE (12% HNT) | 67.4 | 78.0 | 179.1 | 105.0 |
| % weight uptake | — | 15.7% | 165.7% | 55.9% |
| 18 (0% HNT) | 67.9 | 76.7 | 157.0 | 68.3 |
| % weight uptake | — | 13.0% | 131.2% | 5.9% |
| 6-1(15% Ma/Si) | 100.7 | 119.0 | 188.2 | 159.0 |
| % weight uptake | — | 18.2% | 86.9% | 57.9 |

Table 8 below shows the proton conductivity and percent uptake of thickness of the samples before and after impregnation with no argon etching. The proton conductivity was measured at 50° C. and 50% relative humidity. Again, the data shows that samples coated with PCS show the highest percent uptake in thickness when compared to samples coated with Nafion® and SMF solutions, similar to the etched samples described above. This is expected because of the higher concentration of the PCS compared to the other two solutions. After impregnation with Nafion® solution, the conductivity was much lower for Celgard® 2500 and sample 18, while it was about the same for sample 1E (0.0223 to 0.0426 S/cm). The conductivity for samples impregnated with PCS and SMF was the same or improved, ranging from 0.05619 to 0.0315 S/cm, respectively, for the same samples (Celgard® 2500, 1E, 18) for PCS impregnation, ranging from 0.03719 to 0.04713 S/cm for the same samples, respectively, when they were impregnated with SMF solution. Although the percent thickness uptake of the samples impregnated with SMF solution was relatively lower than the other two solutions, namely, Nafion® and PCS, the proton conductivity was higher in the case of SMF when compared to the other two solutions. The same observation was made in the case of the etched samples that were presented in Table 7, where samples coated with SMF showed higher conductivity compared to those coated with PCS and Nafion® solutions.

The PCS coating yielded a higher percent thickness uptake in the case of etched samples, as shown in Table 7, compared to un-etched samples, as shown in Table 9. Finally, these conductivities of the un-etched samples are compared with those of Nafion® 115 and Nafion® 117 membranes, where the conductivities are 0.08112 S/cm and 0.09308 S/cm, respectively, when measured at 50° C. and 50% relative humidity. The argon etching does not appear to give significant improvement in conductivity. For example, the Celgard® 2500 sample and sample 18 coated with SMF gave proton conductivities for un-etched samples of 0.0372 S/cm and 0.04713 S/cm, respectively, compared to 0.0155 S/cm and 0.0381 S/cm for the same samples which were etched with argon, as can be seen from Tables 6 and 8, respectively.

Example 6

The proton conductivity of commercial PEM Membranes (Nafion® 117 and Nafion® 115 and Nafion® 112), as reported in the literature by different researchers using the two-probe and four-probe methods at different temperature and relative humidity conditions were studied. The data shows that the effect of dry humidity versus wet-water conditions for Nafion® 117 is rather significant where the proton conductivity is 0.058 S/cm at 90% RH and 50° C. compared to 0.090 S/cm when immersed in liquid water and measured by the four-probe method and at the same frequency of 100,000 Hz-0.1 Hz (Lee et al. 2005). Also, BEKK/TECH (2007) reported the proton conductivity for Nafion® 117 at 50% RH and 50° C. to be 0.017 S/cm using the four-probe method compared to 0.088 S/cm when measured at 100% RH and 50° C. and this again shows the effect of relative humidity on the proton conductivity of the polyelectrolyte membranes. Another confirmation for the difference between the two-probe method and the four-probe method is that BEKK/TECH (2007) reported proton conductivity for Nafion117 at 100% RH and 50° C. to be about 0.088 S/cm using the four-probe method versus 0.026 S/cm as reported by Bae et al. (2002) using the two-probe method at the same conditions. Again Bae et al. (2002) reported proton conductivity for Nafion® 117 to be 0.015 S/cm compared to 0.078 S/cm as reported by Sone et al. (1996) at the same conditions of 100% RH and 25°/C. This proves that the four-probe method gives almost 4 to 5 times the values given by the two-probe method for proton conductivity at the same measuring conditions as was reported above. The values of proton conductivity of Nafion® 115 and Nafion® 117 PEM membranes were 0.0811 S/cm and 0.0931 S/cm as measured at 50% and 50° C. using the four-probe method. These values are very close to the values given by the literature.

The methanol flux for samples 18 and 1E and commercial samples Nafion® 115 and Nafion® 117 were tested using the Sterlitech® HP4750 high-pressure stirred cell at a pressure of 145 psi at ambient temperature. Table 10 shows the

TABLE 8

Proton conductivity at 50° C. and 50% Relative Humidity and Percent Uptake of Thickness of Samples Before and After Impregnation with No Etching

| Sample | Original Thickness(mm) | Impregnated in Nafion | Impregnated in PCS | Impregnated in SMF |
|---|---|---|---|---|
| Celgard ® 2500 | 0.025 | 0.034 | 0.029 | 0.029 |
| % Thickness uptake/DI-Water (h) | — | 36% 96 | 16% 96 | 16% 96 |
| Conductivity (S/Cm) | — | 0.000894 | 0.05615 | 0.03719 |
| 1E (12% HNT) | 0.050 | 0.068 | 0.069 | 0.060 |
| % Thickness uptake/DI-water (h) | — | 36% 96 | 38% 96 | 20% 96 |
| Conductivity (S/Cm) | — | 0.0223 | 0.0194 | 0.0216 |
| 18 (0.0% HNT) | 0.030 | 0.033 | 0.041 | 0.034 |
| % Thickness uptake DI-water (h) | — | 10% 24 | 36.7% 24 | 13.33% 24 |
| Conductivity (S/Cm) | — | $7.17 \times 10^{-5}$ | 0.0315 | 0.04713 |
| Nafion ® 115 DI-water (h) | 0.127 96 | — | — | — |
| Conductivity (S/Cm) | 0.08112 | — | — | — |
| Nafion ® 117 DI-water (h) | 0.183 96 | — | — | — |
| Conductivity (S/Cm) | 0.09308 | — | — | — |

TABLE 9

Weight and Percent Weight Uptake of Unetched Samples Before and After Impregnation

| Samples | Original Weight (mg) | Impregnated in Nafion ® | Impregnated in PCS | Impregnated in in SMF |
|---|---|---|---|---|
| Celgard ® 2500 | 34.3 | 55.6 | 82.2 | 34.6 |
| % Uptake | — | 62.1% | 139.7% | 0.009% |
| 1E (12% HNT) | 49.1 | 69.8 | 95.4 | 51.5 |
| % Uptake | — | 42.2% | 94.3% | 4.89% |
| 18 (0.0% HNT) | 85.0 | 89.0 | 93.3 | 97.0 |
| % Uptake | — | 4.7% | 9.76% | 14.1% | methanol flux before and after impregnation of sample 18, which is pure polypropylene with no nanomaterials added, before and after plasma etching with argon gas, followed by post-extrusion processing to make it microporous. The data show that the methanol flux for the etched sample decreased from 8.2 kg/m²h to 0.308 kg/m²h when it was impregnated with Nafion® solution and to 1.71 kg/m²h when it was impregnated with the polycarboxylic superplasticizer (PCS). Additionally, for the un-etched sample 18, the methanol flux decreased from 0.1781 kg/m²h to 0.0205 kg/m²h when it was impregnated with Nafion® and to 0.1369 kg/m²h when it was impregnated with PCS. These values of methanol fluxes are far less than those for the commercial Nafion® 115 and Nafion® 117 membranes.

Table 10 further shows that for sample 18 without coating, the methanol flux was less by a factor of 60 and 41 compared to Nafion® 115 and Nafion® 117, respectively. Further, sample 18 had a lower flux of methanol when it was coated with Nafion® solution by a factor of 1593 and 1081, and by a factor of 287 and 195 when it was coated with PCS, compared to Nafion® 115 and Nafion® 117, respectively. This is despite the fact that the thickness of sample 18 is less than that of Nafion® 115 and Nafion® 117 by a factor of about 4.2 to 6.1, respectively. Table 10 also shows that sample 18 gave a much lower flux of methanol after it had been etched and coated with Nafion® and PCS solutions than before they were been exposed to plasma etching. Table 10 additionally shows that the methanol flux of the un-etched sample 1E (12% HNT) before impregnation was 229.26 kg/m²h, and upon impregnation with PCS and SMF, the methanol flux was 90.7 kg/m²h and 63.27 kg/m²h, respectively, which is far less than that of Nafion® 115 and Nafion® 117, by a factor of 5.4-7.8 in the case of PCS coating, and by a factor of 3.7-5.26 in the case of SMF coating, respectively. This is despite the fact that the thickness of sample 1E is less than that of Nafion® 115 and Nafion® 117 by a factor of about 2.54 to 3.66, respectively.

These results show that the commercial Nafion® 115 and Nafion® 117 membranes, despite their relatively high thicknesses, compared to the prepared samples that range from 2.5 to 3.7, in the case of Nafion® 115, and from 3.66 to 5.26 in the case of Nafion® 117, suffer severely from a methanol cross-over, which is a major disadvantage for these membranes to be used for DMFC or for PEMFC applications. It should be noted that the methanol cross-over reduces the efficiency of the fuel cell. Additionally, the PEM membranes prepared as described above have a great advantage over the Nafion® PEM membranes in diminishing methanol cross-over despite the fact that they are only less by a factor of about 2 to 3 in proton conductivity compared to Nafion® 115 and Nafion® 117, as can be seen from Table 10.

Example 7

The nitrogen flux was measured using the gas permeator described above at a pressure of 60 psi. Table 11 shows the nitrogen flux of plasma etched samples before and after impregnation. The results show that the nitrogen flux for all samples prepared, and before impregnation (samples $18_1$, $18_2$, 6-1, $1E_1$, $1E_2$, and $1F_1$), have a significantly lower nitrogen flux than that of the commercial Celgard® 2400 sample. Sample $18_1$ gave a lower nitrogen flux by a factor of about 2 less than those of Nafion® 115 and Nafion® 117, while sample $1E_1$ gave almost the same flux as those of Nafion® 115 and Nafion® 117. Further, all of the prepared samples that were impregnated with Nafion® solution ($18_1$, 6-1, $1E_1$ and $1F_1$) have a much lower nitrogen flux than the un-impregnated samples. However, the samples that were impregnated with PCS (samples $18_2$ and $1E_2$) have a higher nitrogen flux after they were impregnated than before impregnation. This may be due to the cracking in the coated PCS layer of these samples. The thickness of the prepared samples is half that of Nafion® 115 and Nafion® 117, and if they have the same thickness then they would have the same nitrogen flux.

TABLE 10

Methanol Flux at 145 psi and Proton Conductivity at 50° C. and 50% RH Before and After Impregnation for Etched and Unetched Samples

| Sample | Original Thickness (mm) | Impregnated in Nafion ® | Impregnated in PCS | Impregnated in SMF |
|---|---|---|---|---|
| 18(0.0% HNT) | 0.030 | 0.033 | 0.041 | 0.340 |
| % Thickness uptake | — | 10% | 36.7% | 13.33% |
| DI-water (h) | 24 | 24 | 24 | 24 |
| Conductivity (S/cm) | 0.046 | 7.17 × 10⁻⁵ | 0.0315 | 0.0471 |
| Methanol flux (kg/m²h) | 8.2 (etched) | 0.308 (etched) | 1.71 (etched) | — |
|  | 0.1781(un-etched) | 0.0205 (unetched) | 0.1369 (unetched) | — |
| 1E (12% HNT) | 0.050 | 0.068 | 0.069 | 0.060 |
| % thickness uptake | — | 36% | 38% | 20% |
| DI-water (h) | — | 96 | 96 | 96 |
| Conductivity (S/cm) | — | 0.0224-0.0426 | 0.0194 | 0.0216 |
| Methanol flux (kg/m²h) | 229.26 (un-etched) | — | 90.47 (un-etched) | 63.27 (un-etched) |
| Nafion ® 115 | 0.127 | — | — | — |
| DI-water, (h) | 96 | — | — | — |
| Conductivity (S/cm) | 0.08112 | — | — | — |
| Methanol flux (kg/m²h) | 490.73 | — | — | — |
| Nafion ® 117 | 0.183 | — | — | — |
| DI- water, (h) | 96 | — | — | — |
| Conductivity (S/cm) | 0.09308 | — | — | — |
| Methanol flux (kg/m²h) | 332.96 | — | — | — |

TABLE 11

Nitrogen Flux and Percent Thickness Uptake of Plasma Etched Samples with Argon Before and After Impregnation

| Sample | Original Thickness (mm) | Impregnated in Nafion ® | Impregnated in PCS | Impregnated in SMF |
|---|---|---|---|---|
| $18_1$ | 0.020 | 0.038 | — | — |
| % Thick. uptake | — | 90.0% | — | — |
| N₂ Flux: (L/min/cm²) | 9.0 × 10⁻³ | 2.41 × 10⁻³ | — | — |
| $18_2$ | 0.020 | — | 0.083 | — |
| % Thick. uptake | — | — | 315.0% | — |
| N₂ Flux: (L/min/cm²) | 9.0 × 10⁻³ | — | 0.5824 | — |
| 6-1 | 0.110 | 0.131 | — | — |
| % Thick. uptake | — | 19.0% | — | — |
| N₂ Flux: (L/min/cm²) | 0.07 | 1.6174 | — | — |
| $1E_1$ | 0.05 | 0.105 | — | — |
| % Thick. uptake | — | 52.3% | — | — |

TABLE 11-continued

Nitrogen Flux and Percent Thickness Uptake of Plasma Etched Samples with Argon Before and After Impregnation

| Sample | Original Thickness (mm) | Impregnated in Nafion ® | Impregnated in PCS | Impregnated in SMF |
|---|---|---|---|---|
| $N_2$ Flux: (L/min/cm$^2$) | 0.030 | $5.814 \times 10^{-3}$ | — | — |
| 1E$_2$ | | — | | — |
| % Thick. uptake | 0.05 | — | 0.098 49.0% | — |
| $N_2$ Flux: (L/min/cm$^2$) | 0.034 | | 2.5239 | — |
| | | — | | — |
| 1F$_1$ | 0.063 | 0.080 | — | — |
| % Thick. uptake | — | 21.3% | — | — |
| $N_2$ Flux: (L/min/cm$^2$) | 0.100 | $27.46 \times 10^{-3}$ | — | — |
| Nafion ® 115 | 0.127 | — | | |
| $N_2$ Flux: (L/min/cm$^2$) | $4.961 \times 10^{-3}$ | — | — | |
| Nafion ® 117 | 0.183 | — | | |
| $N_2$ Flux: (L/min/cm$^2$) | $5.053 \times 10^{-3}$ | — | — | |
| Celgard ® 2400 | 0.025 | — | — | |
| $N_2$ Flux: (L/min/cm$^2$) | 0.387 | — | | |

While the examples given above have been limited to polypropylene (PP) polymer as the main carrier and as representative to various hydrophobic polymers, it should be understood that other hydrophobic polymers, such as, for example, polyvinylidene fluoride (PVDF), polytrifluoroethylene (PTFE) and other perfluoro polymers may also be used with the nanomaterials given in the above examples, namely, HNTs and PP-grafted maleic anhydride silicate.

It is to be understood that the method of making a nanocomposite polyelectrolyte membrane is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of making a nanocomposite polyelectrolyte membrane, comprising the steps of:
   blending a hydrophobic polymer with a nanofiller to form a dry mix, the nanofiller being selected from the group consisting of halloysite nanotubes and propylene-grafted maleic anhydride nano-layered silica to form a dry mix;
   extruding the dry mix using a twin-screw extruder to form a thin film nanocomposite;
   annealing the thin film nanocomposite to form an annealed thin film nanocomposite;
   cold stretching the annealed thin film nanocomposite at room temperature to form a first stretched annealed nanocomposite;
   stretching the first stretched annealed nanocomposite at a temperature above room temperature to form a second stretched annealed nanocomposite;
   heat setting the second stretched annealed nanocomposite to form a nanocomposite polyelectrolyte membrane;
   plasma etching the nanocomposite polyelectrolyte membrane to form an etched nanocomposite polyelectrolyte membrane; and
   impregnating the etched nanocomposite 3 polyelectrolyte membrane with a sulfonated polymer.

2. The method of making a nanocomposite polyelectrolyte membrane as recited in claim 1, wherein the step of impregnating the etched nanocomposite polyelectrolyte membrane with the sulfonated polymer comprises impregnating the etched nanocomposite polyelectrolyte membrane with a sulfonated polymer selected from the group consisting of sulfonated melamine formaldehyde, a polycarboxylate superplasticizer, and a perfluorosulfonic acid.

3. The method of making a nanocomposite polyelectrolyte membrane as recited in claim 1, wherein the step of extruding the dry mix is performed at a temperature of approximately 200° C.

4. The method of making a nanocomposite polyelectrolyte membrane as recited in claim 3, wherein the step of annealing the thin film nanocomposite comprises annealing the thin film nanocomposite at a temperature of approximately 140° C.

5. The method of making a nanocomposite polyelectrolyte membrane as recited in claim 4, wherein the step of heat setting the second stretched annealed nanocomposite comprises heat setting the second stretched annealed nanocomposite at a temperature of approximately 145° C.

6. The method of making a nanocomposite polyelectrolyte membrane as recited in claim 1, wherein the step of blending the hydrophobic polymer with the nanofiller comprises blending polypropylene with the nanofiller.

7. A method of making a nanocomposite polyelectrolyte membrane, comprising the steps of:
   blending a hydrophobic polymer with a nanofiller selected from the group consisting of halloysite nanotubes and propylene-grafted maleic anhydride nano-layered silica to form a dry mix;
   pelletizing the dry mix;
   extruding the pelletized dry mix using a twin-screw extruder to form a thin film nanocomposite;
   annealing the thin film nanocomposite to form an annealed thin film nanocomposite;
   cold stretching the annealed thin film nanocomposite at room temperature to form a first stretched annealed nanocomposite;
   stretching the first stretched annealed nanocomposite at a temperature ranging from approximately 110° C. and approximately 140° C. to form a second stretched annealed nanocomposite;
   heat setting the second stretched annealed nanocomposite to form a nanocomposite polyelectrolyte membrane;
   plasma etching the nanocomposite polyelectrolyte membrane to form an etched nanocomposite polyelectrolyte membrane; and
   impregnating the etched nanocomposite polyelectrolyte membrane with a sulfonated polymer.

8. The method of making a nanocomposite polyelectrolyte membrane as recited in claim 7, wherein the step of impregnating the etched nanocomposite polyelectrolyte membrane with the sulfonated polymer comprises impregnating the etched nanocomposite polyelectrolyte membrane with a sulfonated polymer selected from the group consisting of sulfonated melamine formaldehyde, a polycarboxylate superplasticizer and perfluorosulfonic acid.

9. The method of making a nanocomposite polyelectrolyte membrane as recited in claim 7, wherein the step of extruding the pelletized dry mix is performed at a temperature of approximately 200° C.

10. The method of making a nanocomposite polyelectrolyte membrane as recited in claim 9, wherein the step of annealing the thin film nanocomposite comprises annealing the thin film nanocomposite at a temperature of approximately 140° C.

11. The method of making a nanocomposite polyelectrolyte membrane as recited in claim 10, wherein the step of heat setting the second stretched annealed nanocomposite comprises heat setting the second stretched annealed nanocomposite at a temperature of approximately 145° C.

12. The method of making a nanocomposite polyelectrolyte membrane as recited in claim 7, wherein the step of blending the hydrophobic polymer with the nanofiller comprises blending polypropylene with the nanofiller.

* * * * *